US011609310B2

(12) United States Patent
Greiner et al.

(10) Patent No.: US 11,609,310 B2
(45) Date of Patent: Mar. 21, 2023

(54) LIDAR DEVICE FOR DETECTING AN OBJECT USING A BEAM REPLICATION UNIT

(71) Applicant: Robert Bosch GmbH, Stuttgart (DE)

(72) Inventors: Alexander Greiner, Reichenbach (DE); Karl Christoph Goedel, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1095 days.

(21) Appl. No.: 16/220,880

(22) Filed: Dec. 14, 2018

(65) Prior Publication Data

US 2019/0196015 A1    Jun. 27, 2019

(30) Foreign Application Priority Data

Dec. 22, 2017  (DE) .......................... 102017223658.2

(51) Int. Cl.

| | | |
|---|---|---|
| *G01S 7/481* | (2006.01) | |
| *G02B 27/09* | (2006.01) | |
| *G01S 17/42* | (2006.01) | |
| *G01S 17/04* | (2020.01) | |
| *G02B 27/10* | (2006.01) | |
| *G02B 27/12* | (2006.01) | |
| *G01S 7/484* | (2006.01) | |

(Continued)

(52) U.S. Cl.
CPC .......... *G01S 7/4817* (2013.01); *G01S 7/4813* (2013.01); *G01S 7/4814* (2013.01); *G01S 17/04* (2020.01); *G01S 17/42* (2013.01); *G02B 27/0944* (2013.01); *G01S 7/484* (2013.01); *G01S 7/4815* (2013.01); *G01S 7/4911* (2013.01); *G01S 17/06* (2013.01); *G02B 27/1093* (2013.01); *G02B 27/126* (2013.01)

(58) Field of Classification Search
CPC .... G01S 7/4817; G01S 7/4813; G01S 7/4814; G01S 17/04; G01S 17/42; G01S 7/484; G01S 7/4911; G01S 17/06; G01S 17/931; G01S 7/481; G01S 7/4865; G02B 27/0944; G02B 27/1093; G02B 27/126; G02B 27/095; G02B 27/10; G02B 26/101; G02B 26/0875; G02B 5/18; G02B 19/0085; G02B 27/42

See application file for complete search history.

(56) References Cited

U.S. PATENT DOCUMENTS

| | | | |
|---|---|---|---|
| 10,009,531 B1* | 6/2018 | Sohn .................... | H04N 5/2259 |
| 2016/0178358 A1* | 6/2016 | Miyasaka .............. | G01B 11/25 |
| | | | 359/558 |

(Continued)

FOREIGN PATENT DOCUMENTS

| | | |
|---|---|---|
| DE | 19927501 A1 | 11/2000 |
| DE | 102006060108 A1 | 6/2008 |

(Continued)

*Primary Examiner* — Jennifer D Bennett
*Assistant Examiner* — Erin R Garber
(74) *Attorney, Agent, or Firm* — Norton Rose Fulbright US LLP; Gerard Messina

(57) ABSTRACT

A LIDAR device for detecting an object comprising a transmitter unit having at least one laser for emitting at least one laser beam; and a receiver unit for receiving laser light that was reflected by the object. The transmitter unit further has at least one beam replication unit for replicating the at least one laser beam to form at least two replicated beams.

7 Claims, 4 Drawing Sheets

(51) Int. Cl.
    *G01S 7/4911*     (2020.01)
    *G01S 17/06*     (2006.01)

(56) References Cited

U.S. PATENT DOCUMENTS

| | | | | |
|---|---|---|---|---|
| 2016/0341969 | A1* | 11/2016 | Manger | G01J 1/0407 |
| 2019/0101623 | A1* | 4/2019 | Galera | G01S 17/88 |
| 2019/0162976 | A1* | 5/2019 | Sondermann | G02B 27/1026 |
| 2019/0204615 | A1* | 7/2019 | Cho | G02B 27/4205 |
| 2019/0310377 | A1* | 10/2019 | Lodin | G01S 17/32 |

FOREIGN PATENT DOCUMENTS

| | | | |
|---|---|---|---|
| DE | 102011000978 | A1 | 8/2012 |
| DE | 102015105393 | A1 | 10/2016 |
| DE | 102017116597 | A1 | 1/2019 |
| EP | 2388615 | A1 | 11/2011 |

\* cited by examiner

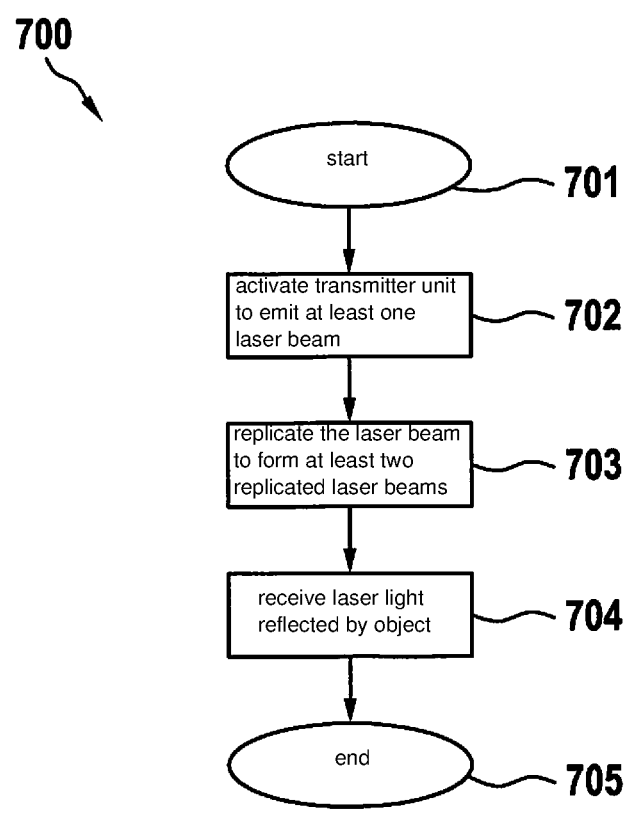

LIDAR DEVICE FOR DETECTING AN OBJECT USING A BEAM REPLICATION UNIT

CROSS REFERENCE

The present application claims the benefit under 35 U.S.C. § 119 of German Patent Application No. DE 102017223658.2 filed on Dec. 22, 2017, which is expressly incorporated herein by reference in its entirety.

FIELD

The present invention relates to a LIDAR device for detecting an object, to a working device and/or vehicle, which is developed with a LIDAR device and to a method for detecting an object using a LIDAR device.

BACKGROUND INFORMATION

European Patent Application No. EP 2 388 615 A1 describes a LIDAR-based 3D point cloud measuring system. The measuring system comprises a base, a housing, a plurality of photon transmitters and photon detectors, which are contained in the housing. The measuring system furthermore comprises a rotating motor that rotates the housing about the base and a communication component that allows for signals to be transmitted from the photon detectors to external components.

SUMMARY

The present invention is based on a LIDAR device for detecting an object comprising a transmitter unit having at least one laser for emitting at least one laser beam and a receiver unit for receiving laser light that was reflected by the object.

According to the invention, the transmitter unit furthermore has at least one beam replication unit for replicating the at least one laser beam to form at least two replicated beams.

The advantage of the present invention is that it is possible to increase the resolution of the LIDAR device in at least one plane without increasing the number of lasers required for this purpose. It is possible to achieve a higher resolution than in conventional LIDAR devices while the number of lasers in the transmitter unit remains the same. It is possible to achieve the same resolution as in conventional LIDAR devices with a smaller number of lasers in the transmitter unit. Instead of using a number n of lasers for a number n of resolution planes, a single laser in the transmitter unit may suffice to achieve the same number n of resolution planes. It is thus possible to dispense with a great number of additional electronic components of the LIDAR device. This makes it possible to produce the LIDAR device more cost-effectively. It is possible to reduce the space requirement of the LIDAR device. It is possible to minimize the number of adjustment steps.

Replicating the at least one laser beam to form the at least two replicated beams produces a beam fan. A beam fan may be made up of diverging replicated beams. The at least two replicated beams may be emitted at different angles with respect to the at least one laser beam. Due to the angular distribution of the replicated beams, the different resolution planes are formed in one plane. Thus it is possible to increase the resolution of the LIDAR device in at least one plane.

The laser light received by the receiver unit may be evaluated using common light transit time methods. For this purpose, the LIDAR device may have a suitable evaluation unit. The evaluation unit may be designed to determine a light transit time of the laser light that is emitted and subsequently received again. Such light transit time methods include pulse methods that determine the time at which a reflected laser pulse is received or phase methods that emit an amplitude-modulated laser light and determine the phase shift with respect to the received laser light.

One advantageous development of the present invention provides for the beam replication unit to be further designed to deflect the at least two replicated beams in a vertical plane and additionally or alternatively in a horizontal plane. A horizontal plane may be understood in this context as the plane that is perpendicular with respect to the direction of the plumb line. A vertical plane may be understood in this context as the plane that is parallel with respect to the direction of the plumb line.

The advantage of this development is that it is possible to increase the vertical resolution and additionally or alternatively the horizontal resolution of a LIDAR device. In this instance it is possible to achieve the increase of the resolution in a cost-effective manner.

Another advantageous embodiment of the present invention provides for the beam replication unit to designed to be transmitting or reflecting.

The advantage of this development is that the beam replication unit may be individually adapted to the optical path of the LIDAR device.

Another advantageous embodiment of the present invention provides for the beam replication unit to be designed as a diffractive optical element. A diffractive optical element may be an optical grate for example. A diffractive optical element may be a holographic optical element. Both phase shifting (for example phase grating) as well as absorbing (for example amplitude grating) designs are possible. The at least two replicated beams are produced by interference on the diffractive optical element.

The advantage of this development is that it provides good control over the resolution in the at least one plane. The diffractive optical element provides good control over the vertical resolution of the LIDAR device. The diffractive optical element provides good control over the vertical field of view of the LIDAR device. The diffractive optical element may be adapted in a simple manner and individually to the requirements of the LIDAR device. Thus it is possible, for example by adapting the grating parameters (grating period, gap width, number of illuminated gaps), to control the angular spacing as well as the intensity distribution across the angles. The angular distribution of the replicated beams may be adapted to the receiver unit. The diffractive optical element may be designed in such a way that the Fourier transform of the reflection or transmission function of the diffractive optical element corresponds to the desired light intensity distribution in the far field.

Another advantageous development of the present invention provides for the beam replication unit to be designed as a refractive optical element. The at least two replicated beams are produced by refraction on the refractive optical element.

The advantage of this development is that it provides good control over the resolutions in the at least one plane.

Another advantageous development of the present invention provides for at least one side of the refractive optical element to be designed as a plane surface. A side of the refractive optical element lying across from the plane surface usually has at least two areas adjacent to one another, the at least two areas having gradients that are distinct from one another.

The advantage of this development is that it is possible to increase both the resolution in a vertical plane as well as the resolution in a horizontal plane.

Another advantageous development of the present invention provides for the LIDAR device to have additionally a control unit that is designed to control the at least one laser. The control unit may further be designed to control additional components of the LIDAR device. The LIDAR device may have a deflection unit for example. The control unit may be designed to control the deflection unit.

Another advantageous development of the present invention provides for the transmitter unit to have at least two lasers.

The advantage of this development is that it is possible to increase the resolution of the LIDAR device in at least one plane even further.

Another advantageous development of the present invention provides for the at least two lasers to be controllable in a time-staggered manner. The at least two lasers may be controllable by a control unit of the LIDAR device.

The advantage of this development is that a time-staggered emission of the respective laser beams of the at least two lasers allows for the laser light received by the receiver unit to be more readily distinguished.

A working device and/or a vehicle is/are also provided in accordance with the present invention, which is/are developed having a LiDAR device as described above. Particularly in a highly automated vehicle, a described LIDAR device may be advantageous for the highly automated driving functions. In a fully automated vehicle as well, a described LIDAR device may be advantageous for the automated driving function. For a highly automated or for a fully automated vehicle, a higher resolution in at least one plane results in a better detection of the surroundings of the vehicle.

Furthermore, a method is provided in accordance with the present invention for detecting an object with the aid of a LIDAR device. The method includes the step of controlling a transmitter unit having at least one laser for emitting at least one laser beam and the step of receiving laser light, which was reflected by the object. The method has the further step of replicating the at least one laser beam to form at least two replicated beams with the aid of a beam replication unit. The transmitter unit may be controlled by a control unit.

BRIEF DESCRIPTION OF THE DRAWINGS

Below, exemplary embodiments of the present invention are explained in greater detail with reference to the figures. Identical reference symbols in the figures designate identical elements or elements that act in the same manner.

FIG. 7 shows an exemplary embodiment of a method for detecting an object with the aid of a LIDAR device.

DETAILED DESCRIPTION OF EXAMPLE EMBODIMENTS

Figure 1:
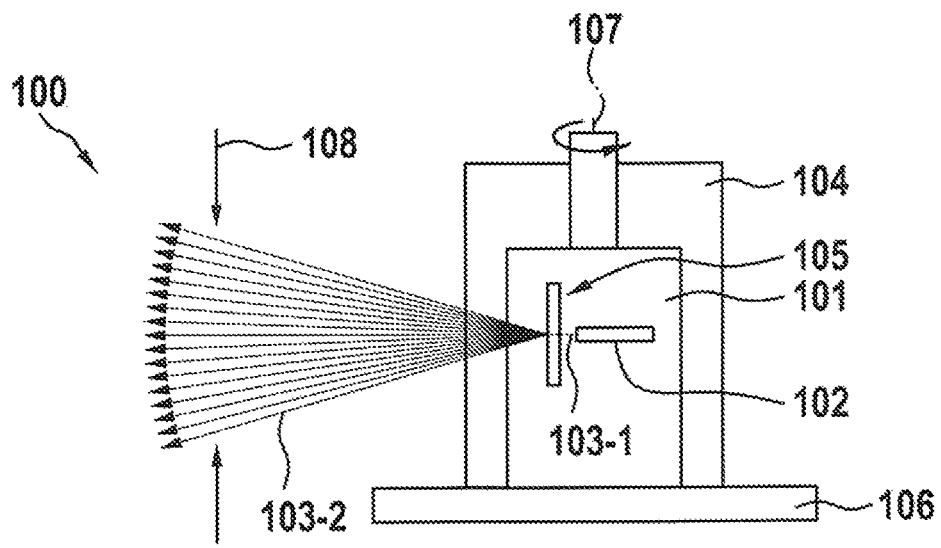
FIG. 1 shows a lateral view of a first exemplary embodiment of a LIDAR device.

FIG. 1 shows by way of example a lateral view of a first exemplary embodiment of LIDAR device 100. LIDAR device 100 has a transmitter unit 101 including a laser 102. Laser 102 emits laser beam 103-1. LIDAR device 100 furthermore includes beam replication unit 105. Beam replication unit 105 may be developed as a diffractive optical element or as a refractive optical element. Laser beam 103-1 strikes beam replication unit 105 and is replicated to form replicated beams 103-2. In the process, laser beam 103-1 is replicated in a vertical plane. Arrows 108 indicate the field of view of LIDAR device 100 into which replicated beams 103-2 are emitted. If an object is located in field of view 108, then replicated beams 103-2 may be scattered by the object. Replicated beams 103-2 may be reflected by the object. LIDAR device 100 furthermore has receiver unit 104. The receiver unit 104 is able to receive laser light reflected by the object. Using an evaluation unit that is not shown here it is possible to evaluate the signals generated on the basis of the received laser light. LIDAR device 100 is situated on a rotating unit 106. Rotating unit 106 is able to rotate about axis of rotation 107. It is possible to deflect replicated beams 103-2 in the horizontal plane by the rotation. This achieves a resolution also in the horizontal plane. LIDAR device 100 may furthermore have a control unit that is not shown here. The control unit may be designed to control rotating unit 106. The control unit may be designed to control laser 102. LIDAR device 100 may thus also include additional optical elements (not shown) such as optical lenses, mirrors and the like.

Figure 2:
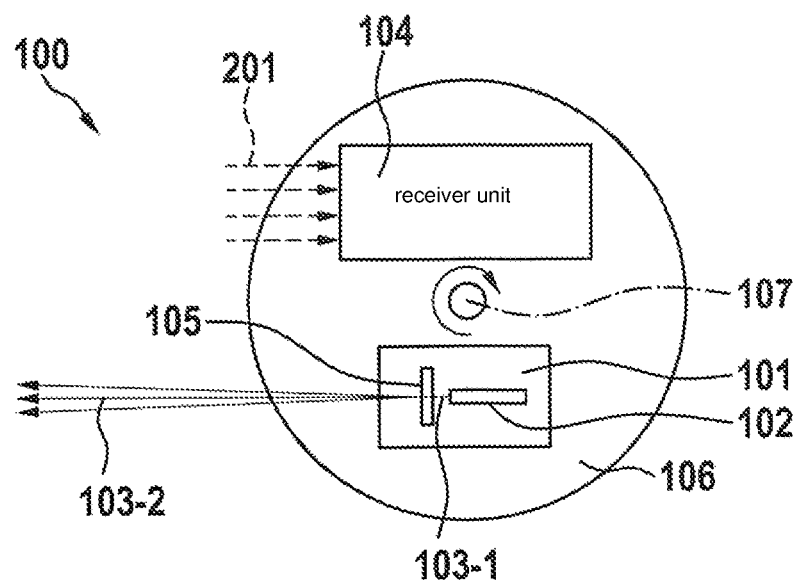
FIG. 2 shows a top view on a first exemplary embodiment of a LIDAR device.

FIG. 2 shows LIDAR device 100 from FIG. 1 in a top view. Identical reference symbols designate identical elements or elements that act in the same manner. As shown in FIG. 2, beam replication unit 105 is designed to be transmitting. Arrows 201 indicate the laser light reflected by the object and received by receiver unit 104.

Figure 3:
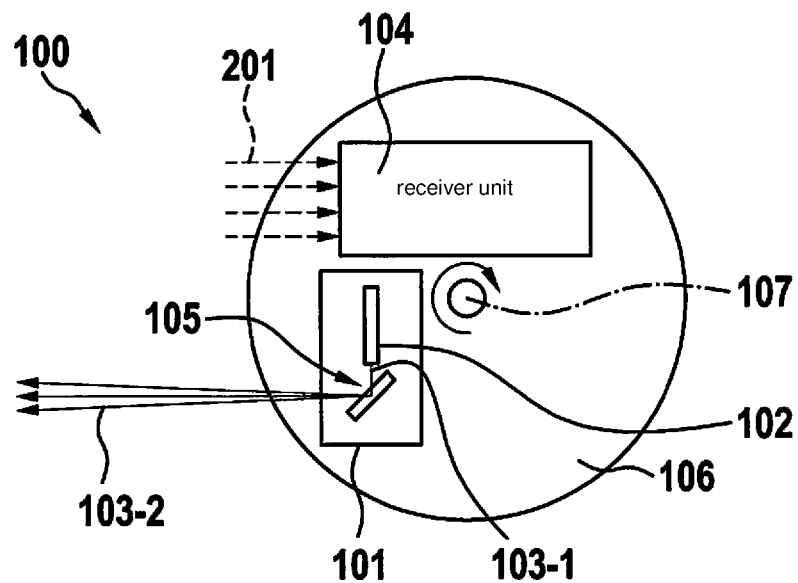
FIG. 3 shows a top view on a second exemplary embodiment of a LIDAR device.

FIG. 3 shows by way of example a top view of a second exemplary embodiment of a transmitter unit 101 of a LIDAR device. Identical reference symbols designate identical elements or elements that act in the same manner as in FIG. 1 or FIG. 2. Beam replication unit 105 may be developed as a diffractive optical element or as a refractive optical element. In this exemplary embodiment, beam replication unit 105 is designed to be reflective.

Figure 4:
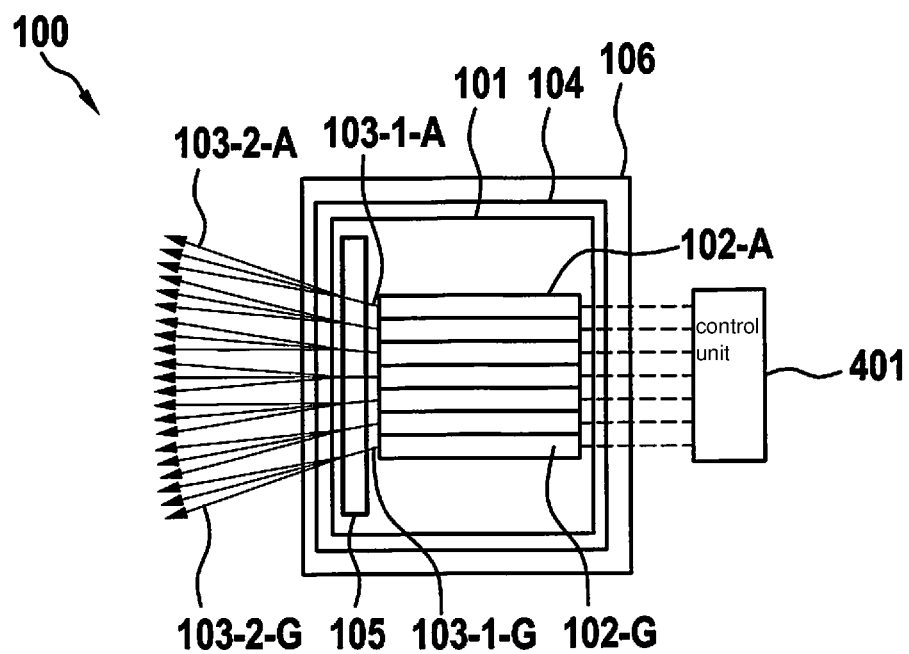
FIG. 4 shows a lateral view of a third exemplary embodiment of a LIDAR device.

FIG. 4 shows a lateral view of a third exemplary embodiment of a LIDAR device 100. Transmitter unit 101 has multiple lasers 102. In FIG. 4, purely by way of example, transmitter unit 101 has seven lasers 102-A through 102-G. Lasers 102-A through 102-G are arranged one above the other. Each laser emits a laser beam. By way of example, emitted laser beam 103-1-A is indicated for laser 102-A. Furthermore, beam replication unit 105 is shown. Beam replication unit 105 may be developed as a diffractive optical element or as a refractive optical element. Each of the laser beams 103-1-A through 103-1-G emitted by lasers 102-A through 102-G strikes beam replication unit 105 and is respectively replicated. Emitted laser beams 103-1-A through 103-1-G are replicated to form replicated beams 103-2-A through 103-2-G. In the process, each of the emitted laser beams 103-1-A through 103-1-G is respectively replicated to form a beam bundle 103-2-A through 103-2-G made up of three replicated beams. Laser beams 103-1-A through 103-1-G are replicated in a vertical plane. Beam replication unit 105 is designed to be transmitting. Alternatively, beam replication unit 105 may be designed to be reflecting. As shown, transmitter unit 101 may be connected to a control unit 401 of the LIDAR device. Control unit 401 is able to control lasers 102-A through 102-G. For this purpose, the control unit is able to control lasers 102-A through 102-G individually. LIDAR device 100 is situated on a rotating unit 106. Rotating unit 106 is able to rotate about an axis of rotation that is not shown here. It is possible to deflect replicated beams 103-2-A through 103-2-G in the horizontal plane by the rotation. This achieves a resolution also in the horizontal plane.

Figure 5:
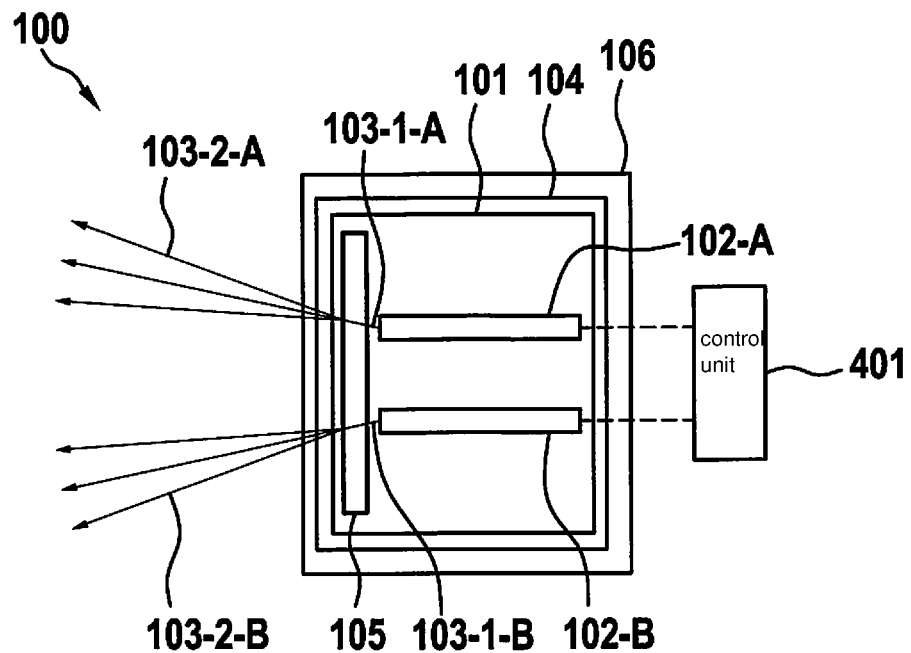
FIG. 5 shows a top view on a fourth exemplary embodiment of a LIDAR device.

FIG. 5 shows a top view on a fourth exemplary embodiment of a LIDAR device. Purely by way of example, transmitter unit 101 has two lasers 102-A and 102-B. Lasers 102-A and 102-B are arranged side by side. Each laser emits a laser beam (103-1-a and 103-1-B). Furthermore, beam replication unit 105 is shown. Beam replication unit 105 may be developed as a diffractive optical element or as a refractive optical element. Each of the emitted laser beams 103-1-A and 103-1-B strikes beam replication unit 105 and is respectively replicated. Emitted laser beams 103-1-A and 103-1-B are replicated to form replicated beams 103-2-A and 103-2-B. In the process, each of the emitted laser beams 103-1-A and 103-1-B is respectively replicated to forma beam bundle 103-2-A and 103-2-B made up of three replicated beams. Laser beams 103-1-A and 103-1-B are in this case replicated in a horizontal plane. Beam replication unit 105 is designed to be transmitting. Alternatively, beam replication unit 105 may be designed to be reflecting. As shown, transmitter unit 101 may be connected to a control unit 401 of the LIDAR device. Control unit 401 is able to control lasers 102-A and 102-B. For this purpose, the control unit is able to control lasers 102-A and 102-B individually. LIDAR device 100 is situated on a rotating unit 106. Rotating unit 106 is able to rotate about an axis of rotation that is not shown here. It is possible to deflect replicated beams 103-2-A and 103-2-B in the horizontal plane by the rotation. This achieves an even higher resolution in the horizontal plane.

Figure 6:
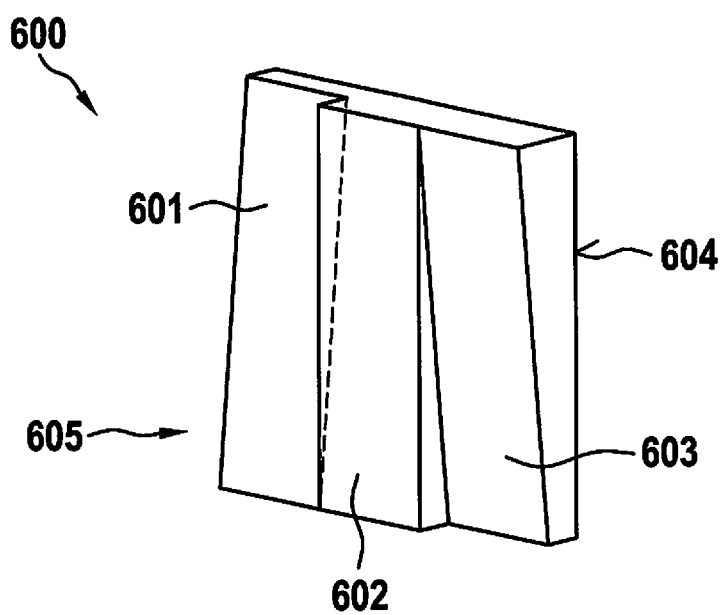
FIG. 6 shows an exemplary embodiment of a beam replication unit.

FIG. 6 shows an exemplary embodiment of a beam replication unit, the beam replication unit being designed as a refractive optical element 600. The refractive optical element may be developed as a glass plate. The refractive optical element 600 has multiple sides. The side marked 604 is developed as a plane surface. The side 605 opposite plane surface 604 has the three mutually adjacent areas 601, 602 and 603. The three areas 601, 602 and 603 have gradients that differ from one another. Alternatively, but now shown here, it would also be possible to attach three glass plates in a retainer in such a way that the three glass plates have gradients that differ from one another. Alternatively, but not shown here, it would also be possible that the refractive optical element 600 is designed as a redirecting mirror having at least two areas, the at least two areas having gradients that differ from one another.

FIG. 7 shows an exemplary embodiment of a method 700 for detecting an object with the aid of a LIDAR device. Method 700 starts in step 701. In step 702, a transmitter unit having at least one laser is activated to emit at least one laser beam. In step 703, the at least one laser beam is replicated to form at least two replicated beams using a beam replication unit. In step 704, laser light that was reflected by the object is received. The method ends in step 705.

What is claimed is:

1. A LIDAR device for detecting an object, comprising:
a transmitter unit having a plurality of lasers for emitting laser beams and at least one beam replication unit for replicating the laser beams to form replicated beams, wherein the beam replication unit includes a refractive optical element;
a receiver unit for receiving laser light of the replicated beams reflected by the object;
a control unit to control the lasers, and which is connected to the transmitter unit; and
a rotating unit to rotate about an axis of rotation to deflect the replicated beams in a horizontal plane;
wherein each of the laser beams are replicated to form a beam bundle made up of three replicated beams,
wherein the lasers are arranged one above the other,
wherein at least one side of the refractive optical element is configured as a plane surface, and a side of the refractive optical element opposite from the plane surface has at least two mutually adjacent areas, the at least two areas having gradients that differ from one another and which are on the same side opposite the plane surface, and
wherein the lasers are activatable in a time-staggered manner.

2. The LIDAR device as recited in claim 1, wherein the beam replication unit is configured to deflect the replicated beams in a vertical plane and/or in a horizontal plane.

3. The LIDAR device as recited in claim 1, wherein the beam replication unit is configurable to be transmitting or reflecting.

4. The LIDAR device as recited in claim 1, wherein the transmitter unit has at least three lasers.

5. The LIDAR device as recited in claim 4, wherein the at least three lasers are activatable in a time-staggered manner.

6. A working device and/or vehicle, comprising:
a LIDAR device for detecting an object, including:
a transmitter unit having a plurality of lasers for emitting laser beams and at least one beam replication unit for replicating the laser beams to form replicated beams, wherein the beam replication unit includes a refractive optical element;
a receiver unit for receiving laser light of the replicated beams reflected by the object;
a control unit to control the lasers, and which is connected to the transmitter unit; and
a rotating unit to rotate about an axis of rotation to deflect the replicated beams in a horizontal plane;
wherein each of the laser beams are replicated to form a beam bundle made up of three replicated beams,
wherein the lasers are arranged one above the other,
wherein at least one side of the refractive optical element is configured as a plane surface, and a side of the refractive optical element opposite from the plane surface has at least two mutually adjacent areas, the at least two areas having gradients that differ from one another and which are on the same side opposite the plane surface, and
wherein the lasers are activatable in a time-staggered manner.

7. A method for detecting an object using a LIDAR device, the method comprising:
activating a transmitter unit having a plurality of lasers to emit laser beams;

replicating the laser beams to form replicated beams using a beam replication unit, wherein the beam replication unit includes a refractive optical element; and receiving laser light of the replicated beams reflected by the object;

wherein there is a control unit to control the lasers, and which is connected to the transmitter unit;

wherein there is a rotating unit to rotate about an axis of rotation to deflect the replicated beams in a horizontal plane;

wherein each of the laser beams are replicated to form a beam bundle made up of three replicated beams, wherein the lasers are arranged one above the other, wherein at least one side of the refractive optical element is configured as a plane surface, and a side of the refractive optical element opposite from the plane surface has at least two mutually adjacent areas, the at least two areas having gradients that differ from one another and which are on the same side opposite the plane surface, and wherein the lasers are activatable in a time-staggered manner.

\* \* \* \* \*